United States Patent [19]
Smith et al.

[11] Patent Number: 6,036,737
[45] Date of Patent: Mar. 14, 2000

[54] SAFETY CABINET HAVING EASILY ATTACHABLE AND DETACHABLE TRANSITION BOOT

[75] Inventors: Dennis H. Smith, Marietta; Matt Brooker, Beverly, both of Ohio; Raquel Wager, Waverly, W. Va.

[73] Assignee: Forma Scientific, Inc., Marietta, Ohio

[21] Appl. No.: 09/104,790

[22] Filed: Jun. 25, 1998

[51] Int. Cl.[7] .................................................. B01D 46/00
[52] U.S. Cl. ............................ 55/385.2; 55/471; 55/473; 55/491; 55/DIG. 18; 454/56; 454/57; 454/58; 454/62
[58] Field of Search .......................... 55/385.2, DIG. 18, 55/491, 467, 471, 472, 473; 454/56, 57, 58, 60, 61, 62

[56] References Cited

U.S. PATENT DOCUMENTS

| | | | |
|---|---|---|---|
| 3,128,476 | 4/1964 | Lash ............................................. | 2/270 |
| 3,874,754 | 4/1975 | Saunders et al. .......................... | 454/56 |
| 3,895,570 | 7/1975 | Eagleson, Jr. .............................. | 98/115 |
| 4,098,174 | 7/1978 | Landy ................................ | 55/DIG. 18 |
| 4,100,847 | 7/1978 | Norton ............................... | 55/DIG. 18 |
| 4,127,106 | 11/1978 | Jensen ................................ | 55/DIG. 18 |
| 4,202,676 | 5/1980 | Pelosi, Jr. et al. ....................... | 55/385.2 |
| 4,276,819 | 7/1981 | Goldman et al. .......................... | 98/115 |
| 4,445,251 | 5/1984 | McElroy .................................... | 15/316 |
| 4,548,627 | 10/1985 | Landy ................................ | 55/DIG. 18 |
| 4,637,301 | 1/1987 | Shields .................................... | 98/115.3 |
| 4,832,717 | 5/1989 | Peters ................................ | 55/DIG. 18 |
| 4,984,828 | 1/1991 | Lepissier .................................. | 285/200 |
| 5,230,604 | 7/1993 | Glaser et al. .............................. | 415/60 |
| 5,257,957 | 11/1993 | Diccianni et al. ......................... | 454/57 |
| 5,295,902 | 3/1994 | Hock ......................................... | 454/57 |
| 5,316,560 | 5/1994 | Krone-Schmidt et al. ............. | 55/385.2 |
| 5,368,341 | 11/1994 | Larson ..................................... | 285/260 |
| 5,380,244 | 1/1995 | Tipton ...................................... | 454/57 |
| 5,562,593 | 10/1996 | Sammel ................................... | 588/261 |
| 5,665,128 | 9/1997 | Peters et al. ........................ | 55/DIG. 18 |
| 5,700,190 | 12/1997 | Johnson et al. ............................ | 454/57 |

*Primary Examiner*—Duane S. Smith
*Attorney, Agent, or Firm*—Wood, Herron & Evans, L.L.P.

[57] ABSTRACT

A safety cabinet having a work area defined by an enclosure and including an air circulation and cleaning system. The air circulation and cleaning system includes a plurality of air plenums and passageways through which air is circulated by a blower assembly. A portion of the air exiting the blower is directed through a transition boot and exhaust plenum and a remaining portion of the air exiting the blower assembly is directed into the work area through a perforated divider plate and a supply plenum. The transition boot between the exhaust and supply plenums include resealable fasteners disposed along a seam between first and second ends thereof and around a first end thereof which is attached to the exhaust plenum.

15 Claims, 3 Drawing Sheets

SAFETY CABINET HAVING EASILY ATTACHABLE AND DETACHABLE TRANSITION BOOT

BACKGROUND OF THE INVENTION

The present invention generally relates to laboratory work enclosures or safety cabinets having an isolated work space and, more particularly, to biological safety cabinets constructed to prevent airborne contaminants within the work space from escaping from the cabinet into the ambient environment.

In general, safety cabinets have been developed for protecting a technician working with various toxic and hazardous materials, such as biological matter and radiological materials, from exposure to airborne contaminants generated during the handling of these materials. The containment or isolation of hazardous and toxic laboratory substances has generally been accomplished by providing a work area which is enclosed with a hood structure having one or more access openings to a technician. The access openings allow the technician, for example, to reach into the work area to handle the material contained in the hood structure. Since these access openings provide another avenue for transfer of hazardous and toxic airborne contaminants between the inside of the hood structure and the outside or ambient environment, it has been a well known past practice to provide a means for causing a continuous positive air flow into the hood structure through the access opening or openings. This continuous flow of air from the ambient environment through the access opening or openings prevents the escape of any airborne contaminants from the work area.

Many prior safety cabinet structures include high efficiency particulate air (HEPA) filters for filtering air being directed into the work area and air being exhausted from the cabinet into the ambient environment. The air being directed into the work area is drawn both from air recirculated from the work area and air taken in from the ambient environment through the access opening or openings. Thus, the HEPA filter which filters air entering the work area, i.e., the "supply filter", can ensure that any contaminants picked up from the work area are not recirculated back into the work area and further that contaminants from the ambient air are not circulated through the work area. The HEPA filter which filters air exhausted from the cabinet, i.e., the "exhaust filter" ensures that hazardous and toxic airborne contaminants generated by the material contained in the cabinet are not exhausted into the ambient environment. These filters must be replaced on regular intervals depending on the application.

Illustrative examples of safety cabinet structures of the above-mentioned type are found in U.S. Pat. No. 3,895,570 issued to Eagleson, Jr. on Jul. 22, 1975, U.S. Pat. No. 4,637,301 issued to Shields on Jan. 20, 1987 and U.S. Pat. No. 5,380,244 issued to Tipton on Jan. 10, 1995. Each of these patents disclose work stations or safety cabinets of the general type described above having one or more replaceable HEPA filters for cleaning air which is circulated through the cabinet structure.

In cabinets such as the one disclosed in U.S. Pat. No. 5,380,244, a transition boot is connected between the supply and exhaust plenums. Typically, these transition boots have been flexible conduits, such as vinyl conduits, which are mounted to portions of the exhaust and supply plenums. These boots must be disconnected from the exhaust plenum and/or the supply plenum to regularly replace the internal HEPA filters. Typically, the boot is permanently fastened to the supply plenum with screws that fasten one end of the boot to the supply plenum in conjunction with a metal clamping member. A typical manner of mounting the transition boot to the exhaust plenum has been to place adhesive around the boot and then apply the boot to an exhaust filter damper. After the boot is in place, a band of plastic or metal is tightened over the boot to the exhaust filter damper such that no air leaks around the connection. This type of connection is time consuming during assembly and, in addition, makes replacement of the transition boot difficult. In this regard, to remove this end of the boot during filter maintenance, the band is cut and the adhesively secured end must be peeled away. To reattach the boot, adhesive must again be applied and a new band must be secured in place all within a space that is not easily accessible.

Another problematic area in safety cabinet design is that of sizing the filters appropriately to the cabinet and controlling air flow through these filters such that a uniform air flow is created within the work area of the cabinet. It has been generally recognized that a lower pressure drop across the exhaust filter and a higher pressure drop across the supply filter will allow better control of air flow through the cabinet. In this regard, the lower pressure drop through the exhaust filter will initially allow greater air flow through the exhaust plenum than the supply plenum of the cabinet. Once this situation is created, an adjustable damper assembly may be used in the exhaust air flow to restrict the amount of air flowing through the exhaust plenum. This will correspondingly increase the amount of air being forced in an opposite direction through the supply plenum and into the work area. In the past, a larger filter area has been used in the exhaust plenum to ensure a lower pressure drop across the exhaust filter. However, this can undesirably increase the size and expense of the exhaust filter. Various manners of preventing air from being directly forced from a blower assembly through the supply filter have included diffuser vane structures, diffuser panels and blast plates mounted in the vicinity of the blower assembly outlet. None of the solutions to these solutions to the air flow control problems and the related problems of filter design have been entirely satisfactory.

It would therefore be desirable to provide an easier manner of assembling and disassembling the transition boot of a safety cabinet and a better manner of controlling air flow in a safety cabinet.

SUMMARY OF THE INVENTION

To address problems such as those mentioned above, the present invention provides a safety cabinet including an enclosure having an accessible work area, an air supply plenum and an air exhaust plenum each having respective transition boot mounting portions. As is typical, the enclosure includes a blower assembly for circulating air through the work area and into the supply and exhaust plenums. In accordance with the invention, a flexible boot member having first and second ends is connected respectively to the supply and exhaust plenum mounting portions to facilitate the exchange of air from the supply plenum to the exhaust plenum. The boot is connected to at least one of these mounting portions with resealable fasteners and the boot member can further include a resealable seam portion extending generally between the first and second ends. These resealable fasteners and seam portions allow quick assembly, disassembly and selected access to the interior cabinet portion which is otherwise obstructed by the boot member. At the same time, the resealable fasteners and seam portion may be securely fastened to prevent significant air leakage.

In the preferred embodiment, the resealable fasteners and the resealable seam portion further comprise hook and loop fastener material. To further facilitate easy assembly and disassembly, one of a hook or loop type fastener is disposed on an inside portion of the first end of the boot member and the other of the hook and loop type fastener is disposed on an outside portion of the exhaust plenum mounting portion. The resealable seam portion preferably intersects with at least the first end of the boot member and the fastener material located thereon. The boot member may be connected to the supply plenum mounting portion with a conventional clamp assembly, such as with metal bands and screw fasteners, since this end may remain permanently affixed to the supply plenum.

The present invention further contemplates a safety cabinet having an improved air flow control system. Generally, the safety cabinet includes an enclosure having an accessible work area, an air supply area, such as a plenum including a supply filter, and an air exhaust area, such as a plenum including an exhaust filter. A blower assembly is operatively connected to the enclosure for circulating air through the work area and into the supply and exhaust areas. In accordance with one aspect of the invention, a plate structure generally divides the supply and exhaust filter areas and this plate has a plurality of openings to allow a restricted amount of air through the supply filter. In the preferred embodiment, the blower assembly blows air onto the side of the plate facing the exhaust filter and, while the openings in the plate allow a portion of the air to travel through the supply filter, the plate primarily promotes air flow through the exhaust filter until the exhaust flow is restricted in some way. This restriction may be accomplished with a conventional damper assembly. Stated another way, the plate structure creates a larger pressure drop across the supply filter than the pressure drop that exists across the exhaust filter. Once this situation is created, an air flow adjuster, in the form of a damper assembly, may be used in the exhaust area to precisely control the air flow through the exhaust and therefore control the air flow in the opposite direction through the supply filter. The plate structure may be defined as an air flow restricting plate structure having openings and mounted along one side of the supply filter. Except for the openings, the plate structure prevents air flow through the supply filter and therefore creates the initially higher pressure drop across the supply filter. The blower assembly is mounted to blow air into a space preferably above and in a direction generally parallel to the air flow restricting plate structure.

These and other advantages and objectives of the invention will become more readily apparent to those of ordinary skill upon review of the following detailed description taken in conjunction with the accompanying drawings.

DETAILED DESCRIPTION OF THE PREFERRED EMBODIMENT

Figure 2:
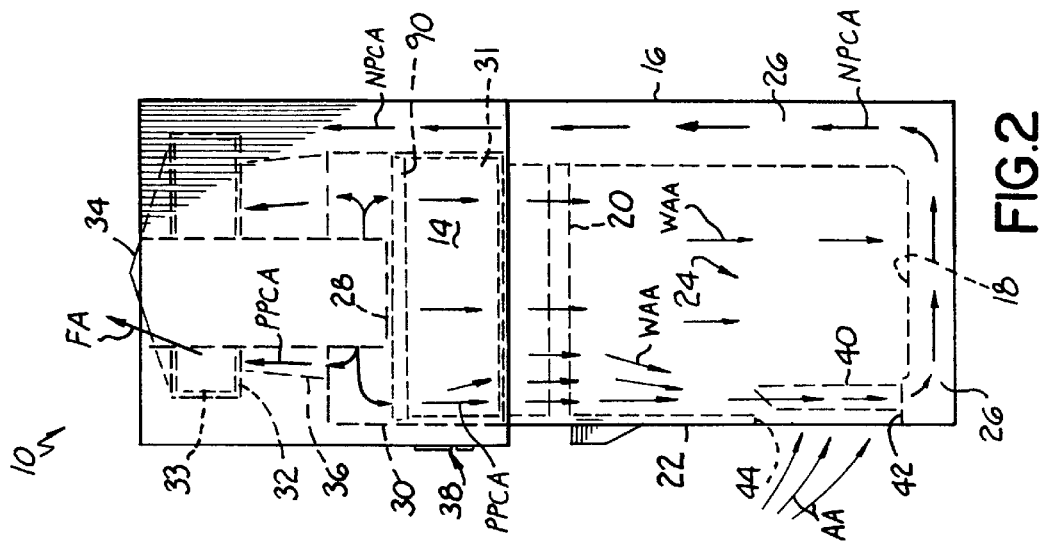
FIG. 2 is a side plan view of the cabinet shown in FIG. 1.
Figure 1:
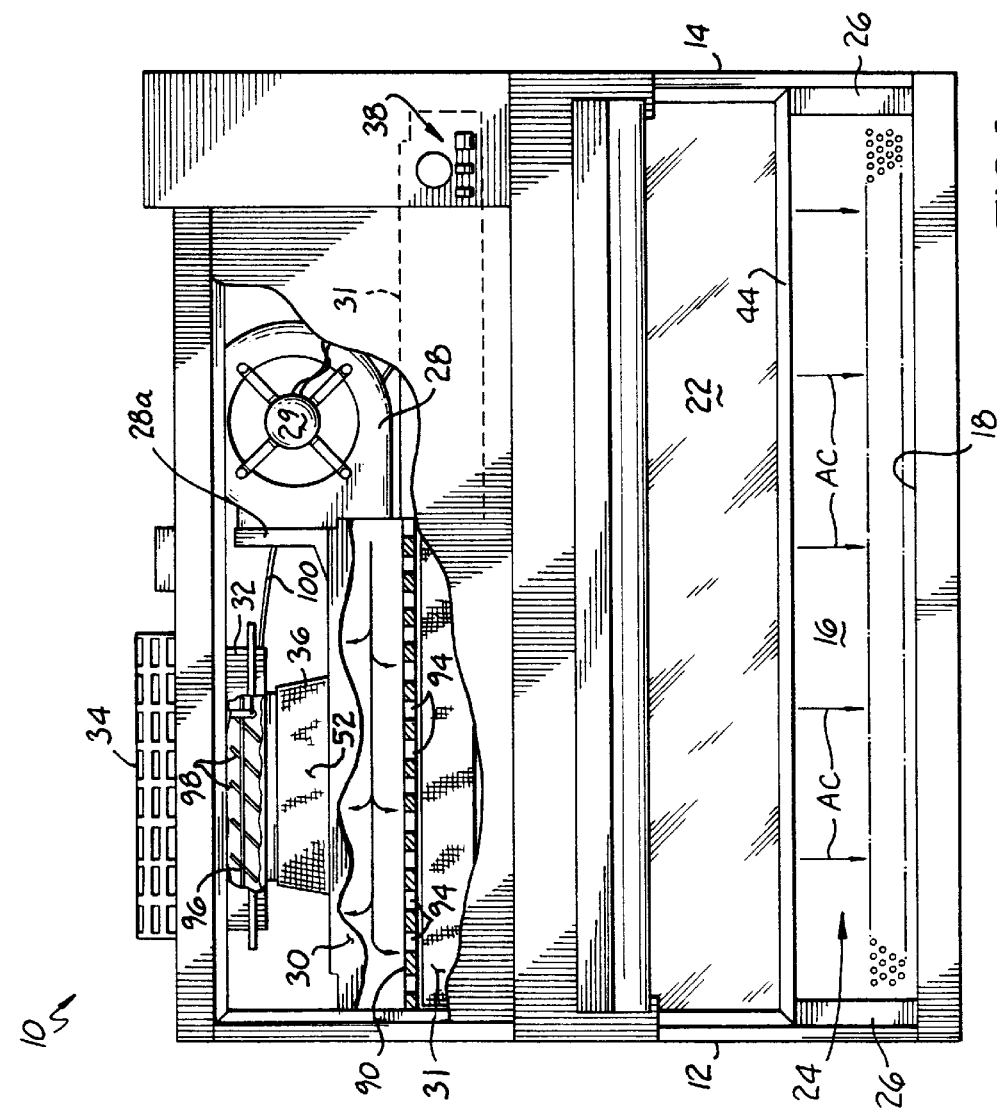
FIG. 1 is a front plan view, partially broken away, showing a safety cabinet of the present invention.

FIGS. 1 and 2 illustrate one preferred embodiment of a biological safety cabinet 10 constructed in accordance with the present invention. Cabinet 10 includes side walls 12, 14 and a rear wall 16. A bottom wall or floor 18 defines a work surface and an air diffuser 20 forms a top wall. A front window 22 is movable in a vertical direction for accessing a work area 24. A negative pressure side plenum 26 surrounds side walls 12, 14, rear wall 16 and bottom wall 18 of cabinet 10. A blower assembly 28 connected to a support structure 28a and powered by a motor 29 creates negative pressure within plenum 26 by forcing air into a supply plenum 30 and through an associated supply filter 31, as will be described. Preferably, as is conventional, all filters in cabinet 10 are high efficiency particulate air (HEPA) filters, with the supply filter being located above the air diffuser or top wall 20. An exhaust filter 33 is preferably mounted within an exhaust plenum 32 located at the top of cabinet 10 along with an exhaust filter guard 34. A transition boot member 36, constructed in accordance with the invention and described further below, provides an air path between the supply plenum 30 and exhaust plenum 32. A control panel 38 is provided on the front of cabinet 10 for containing the necessary electrical controls, which may be conventional, for operating cabinet 10 and particularly for operating blower assembly 28.

FIG. 2 specifically illustrates the flow pattern of air within safety cabinet 10. When cabinet power is activated, such as by a switch on control panel 38, the blower assembly 28 is activated to start air circulation through cabinet 10. Blower assembly 28 draws ambient air AA into channel sections 40 as well as threshold 42 of cabinet 10 and ultimately into negative pressure plenum 26 upwardly to blower assembly 28. Negative pressure created by blower assembly 28 draws this ambient air AA as well as contaminated air from work area 24 through the negative pressure plenum 26 upwardly to the blower assembly 28. This mixture of ambient air AA and contaminated air from work area 24 is represented as negative pressure contaminated air NPCA traveling within negative pressure plenum 26 as shown in FIG. 2.

After the negative pressure contaminated air NPCA has passed through the blower assembly 28, it becomes positive pressure contaminated air PPCA. A portion of the positively pressurized contaminated air, e.g., approximately 40% thereof, travels upwardly through the transition boot member 36, and into exhaust plenum 32, and through filter 33 before release to ambient. The remaining portion travels downwardly through supply plenum 30 and the filter 31 contained therein. This filtered air FA passes downwardly into work area 24 as work area air WAA where it becomes contaminated from products contained within the work area 24. The work area air WAA is drawn into plenum 26 through slots (not shown) contained in side walls 12, 14, rear wall 16, threshold 42, and channel sections 40. The operation of this system is fully described in U.S. Pat. No. 5,295,902, this patent being assigned to the assignee of the present invention and the disclosure of which is incorporated by reference herein. A detailed description of these aspects of the preferred embodiment therefore will not be given as they do not form a part of the inventive aspects described herein.

As shown in FIG. 1, the circulation of work area air WAA downwardly through work area 24 and past a lower edge 44 of window 22 creates an air curtain AC between lower edge 44 of window 22 and threshold 26 of cabinet 10, which has an air intake grill (not shown) thereon. This air intake grill communicates with plenum 26 and, when a negative pressure is created within plenum 26 by blower assembly 28, the work area air WAA making up the air curtain AC travels downwardly from the lower edge 44 of window 22 to the intake grill. This clean filtered air FA descends uniformly through the work area, for example, at a rate of about 60–80 linear feet per minute.

Figure 3:
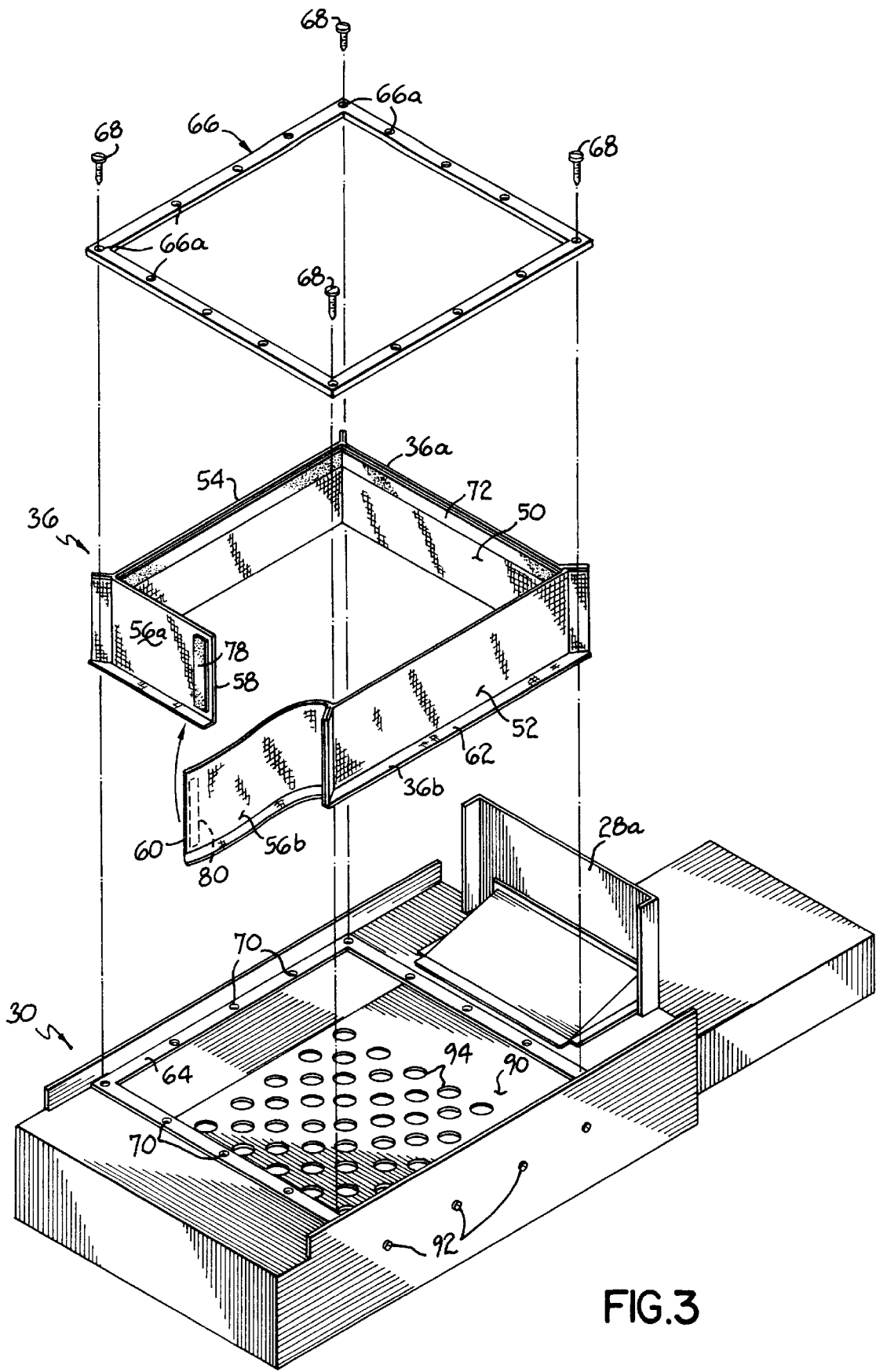
FIG. 3 is an exploded view of a transition boot member of this invention and its connection to the supply plenum.

Referring now to FIG. 3, transition boot 36 of the present invention includes three sides 50, 52, 54 and a fourth side comprised of first and second side portions 56a, 56b. Transition boot member 36 is preferably formed from a conventional vinyl material or from other material appropriate for the application. Side portions 56a, 56b meet at respective edges 58, 60 which preferably extend between first and second ends 36a, 36b of transition boot 36. Second end 36b of transition boot member 36 includes a flange portion 62 which seats against a mounting portion 64 associated with supply plenum 30. A clamp member 66 seats against flange portion 62 and clamps this flange portion 62 against mounting portion 64 using threaded fasteners 68 extending through holes 66a in clamp member 66 and threaded holes 70 in mounting portion 64.

Figure 4:
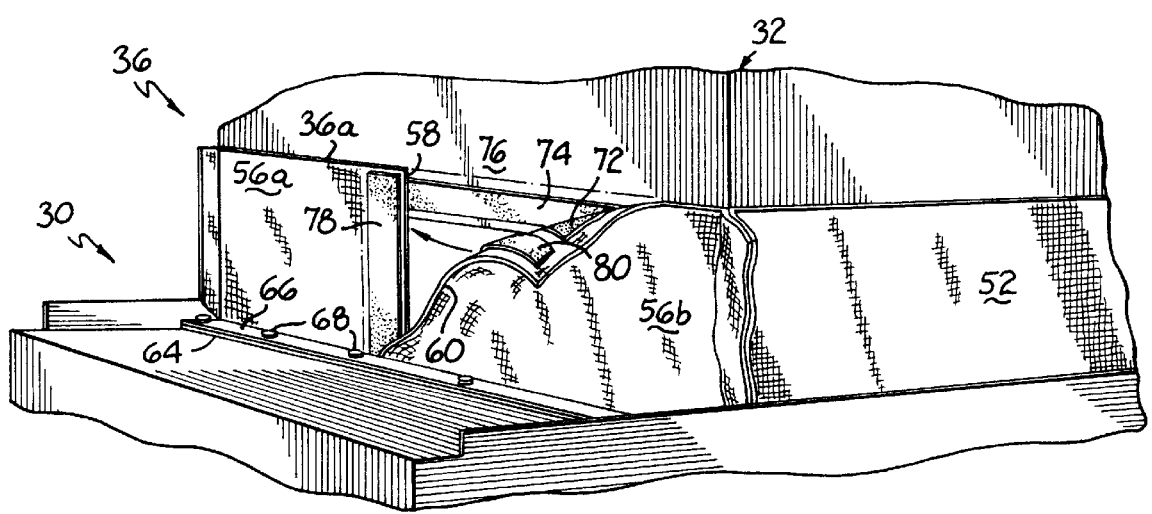
FIG. 4 is a perspective view showing the boot member being connected between the supply plenum mounting portion and the exhaust plenum mounting portion.

In accordance with the invention, and as shown in FIGS. 2 and 3, resealable fastening material 72 is affixed around the inside of first end 36a of transition boot member 36. These may be separate strips or, more preferably, one continuous strip of a hook or loop type fastener material. A complimentary hook or loop type fastener material 74 is applied around a mounting portion 76 of exhaust plenum 32 as shown in FIG. 4. Again, material 74 may be separate strips or one continuous strip. Finally, edges 58, 60 of boot side portions 56a, 56b also contain complimentary hook and loop material 78, 80. Preferably this hook and loop material 78, 80 comprises a strip of material extending from end 36a to end 36b. However, this seam portion may simply extend from first end towards second end by a short distance to facilitate easy removal and application thereof to mounting portion 76 of exhaust plenum 32.

In accordance with the invention, therefore, it will be appreciated that assembly and disassembly of transition boot 36 will be much easier than with past boots, especially as necessary to remove supply plenum 30 by first detaching boot end 36a. After the necessary filter or filters have been replaced, supply plenum 30 is replaced and transition boot 36 is easily placed around mounting portion 76 and respective fasteners 72, 74 and 78, 80 are quickly engaged to reattach boot member 36.

Still referring to FIGS. 1–3, a divider plate 90 is provided for generally separating the supply filter 31 from the exhaust filter 33. Divider plate 90 may be mounted within a portion of supply plenum 30 by fasteners 92. Divider plate 90 further includes a plurality of openings or, more preferably, apertures 94 which allow a restricted amount of air to pass through plate 90, and through filter 31 into work area 24. Blower assembly 28 blows air horizontally above and generally parallel to plate 90. Movement of this air through supply filter 31 is restricted by divider plate 90. Therefore, with damper assembly 96 in a fully opened position, air will travel through exhaust plenum 32 freely because of the lower pressure drop across exhaust filter 33. To increase air flow through supply filter 31, movable slats 98 of damper assembly 96 may be gradually closed off by a cable assembly 100. This will effectively increase the pressure drop across exhaust plenum 32 to force more air through supply filter 31 until the desired uniform air flow through work area 24 is achieved.

Although a preferred embodiment of the present invention has been shown and described in detail, many modifications and adaptations of the invention will be readily apparent to those of ordinary skill in the art and applicant intends only to be bound by the claims appended hereto.

What is claimed is:

1. A safety cabinet comprising:

an enclosure including an accessible work area, an air supply plenum with a boot mounting portion and an air exhaust plenum with a boot mounting portion, a blower assembly operatively connected to the enclosure for circulating air through the work area and into the supply and exhaust plenums, and a flexible boot member having a first end connected to the boot mounting portion of the exhaust plenum and a second end connected to the boot mounting portion of the supply plenum to facilitate the exchange of air from the supply plenum to the exhaust plenum, wherein one of a hook and loop fastener material is disposed on an inside portion of the first end of the boot member and the other of the hook and loop fastener is disposed on an outside portion of the boot mounting portion of the exhaust plenum to releasably connect the boot member to the boot mounting portion of the exhaust plenum.

2. The safety cabinet of claim 1, wherein a resealable seam portion extends from the first end of the boot member toward the second end.

3. The safety cabinet of claim 2, wherein the resealable seam portion comprises hook and loop fastener material.

4. A safety cabinet comprising:

an enclosure including an accessible work area, an air supply plenum with a boot mounting portion and an air exhaust plenum with a boot mounting portion, a blower assembly operatively connected to the enclosure for circulating air through the work area and into the supply and exhaust plenums, and a flexible boot member having a first end connected to the boot mounting portion of the exhaust plenum and a second end connected to the boot mounting portion of the supply plenum to facilitate the exchange of air from the supply plenum to the exhaust plenum, wherein one of the first and second ends of the boot member is connected to the respective one of the exhaust and supply plenum boot mounting portions with resealable fasteners and the boot member further includes a resealable seam portion intersecting said one of the first and second ends and extending toward the other of the first and second ends.

5. The safety cabinet of claim 4, wherein the resealable fasteners and the resealable seam portion further include hook and loop fastener material.

6. The safety cabinet of claim 5, wherein one of a hook and loop fastener is disposed on an inside portion of the first end of the boot member and the other of the hook and loop fastener is disposed on an outside portion of the exhaust plenum mounting portion.

7. The safety cabinet of claim 4, wherein the resealable seam portion extends from the first end of the boot member to the second end of the boot member.

8. The safety cabinet of claim 4, wherein the first end of the boot member is secured to the exhaust plenum mounting portion with hook and loop fastener portions and the second end is secured to the supply plenum mounting portion with a clamp assembly.

9. A safety cabinet comprising:

an enclosure including an accessible work area, an air supply area including a supply filter and an air exhaust area including an exhaust filter, a blower assembly operatively connected to the enclosure for circulating air through the work area and into the supply and exhaust areas, and a plate structure generally dividing the supply and exhaust filter areas, the plate structure having a plurality of openings and having one side facing the supply filter and another side facing the exhaust filter, wherein the blower assembly blows air adjacent to the side of the plate structure facing the exhaust filter to help promote uniform air flow through the supply filter area.

10. The safety cabinet of claim 9, wherein the plate structure is disposed horizontally and the blower assembly blows air generally parallel to the plate structure.

11. The safety cabinet of claim 9, wherein the exhaust area is operatively connected with an air flow adjuster for regulating the amount of air flow through the exhaust area and therefore regulating the amount of air flow through the supply area.

12. The safety cabinet of claim 9, wherein the air flow adjuster is a movable damper assembly.

13. A safety cabinet comprising:

an enclosure including an accessible work area, an air supply area including a supply filter and an air exhaust area including an exhaust filter, a blower assembly operatively connected to the enclosure for circulating air into the supply and exhaust areas and through the work area, and an air flow restricting plate structure having openings and mounted along one side of the supply filter, wherein the blower assembly blows air between the supply and exhaust filters and the plate structure can promote a higher pressure drop across the supply filter than across the exhaust filter.

14. The safety cabinet of claim 13, wherein the air flow restricting plate structure is mounted to separate the supply and exhaust filters.

15. The safety cabinet of claim 14, wherein the blower assembly blows air into a space above and in a direction generally parallel to the air flow restricting plate structure.

* * * * *